US012771188B2

(12) United States Patent
Metz

(10) Patent No.: US 12,771,188 B2
(45) Date of Patent: Oct. 20, 2026

(54) STATOR ASSEMBLY WITH POTTING BODY FORM FIT TO STATOR RECEPTACLE PORTION

(71) Applicant: BorgWarner Inc., Auburn Hills, MI (US)

(72) Inventor: Dietmar Metz, Meckenheim (DE)

(73) Assignee: BORGWARNER INC., Auburn Hills, MI (US)

( * ) Notice: Subject to any disclaimer, the term of this patent is extended or adjusted under 35 U.S.C. 154(b) by 186 days.

(21) Appl. No.: 18/426,206

(22) Filed: Jan. 29, 2024

(65) Prior Publication Data

US 2024/0258846 A1 Aug. 1, 2024

(30) Foreign Application Priority Data

Jan. 30, 2023 (DE) ..................... 10 2023 200 716.9

(51) Int. Cl.

*H02K 1/18* (2006.01)
*H02K 7/14* (2006.01)
*H02K 15/02* (2006.01)
*H02K 15/12* (2006.01)

(52) U.S. Cl.

CPC ................. *H02K 1/18* (2013.01); *H02K 7/14* (2013.01); *H02K 15/02* (2013.01); *H02K 15/12* (2013.01)

(58) Field of Classification Search

CPC H02K 1/182; H02K 1/18; H02K 7/14; H02K 9/06; H02K 15/02; H02K 15/12; H02K 21/24

USPC ................................................ 310/43, 254.1

See application file for complete search history.

(56) References Cited

U.S. PATENT DOCUMENTS

| | | | | | |
|---|---|---|---|---|---|
| 5,986,365 | A * | 11/1999 | Kuwert | H02K 3/38 | 360/99.08 |
| 2001/0045782 | A1* | 11/2001 | Lieu | H02K 15/12 | 310/67 R |
| 2010/0141058 | A1* | 6/2010 | Kim | H02K 3/46 | 310/43 |
| 2015/0372544 | A1* | 12/2015 | Iwasaki | H02K 21/24 | 310/43 |
| 2016/0069349 | A1* | 3/2016 | Kreidler | H02K 11/33 | 29/888.024 |
| 2025/0030281 | A1* | 1/2025 | Koch | H02K 7/14 | |

* cited by examiner

*Primary Examiner* — Michael Andrews

(74) *Attorney, Agent, or Firm* — Howard & Howard Attorneys PLLC

(57) ABSTRACT

A stator assembly (10) for an axial flux motor (100) with a rotation axis (100*a*). The stator assembly (10) has a stator receptacle portion (30) of a motor housing (20) of the axial flux motor (100), a stator (40) and a potting body (50). The stator receptacle portion (30) defines a disk-shaped contact face (32*a*) for receiving the stator. The stator (40) is disposed on the disk-shaped contact face (32*a*). The stator (40) is potted in the stator receptacle portion (30). The potting body (50) is connected to the stator receptacle portion (30) in a form-fitting manner in such a way that the stator (40) in the stator receptacle portion (30) is secured by the potting body (50) at least in the axial direction (2).

12 Claims, 7 Drawing Sheets

STATOR ASSEMBLY WITH POTTING BODY FORM FIT TO STATOR RECEPTACLE PORTION

TECHNICAL FIELD

The present disclosure relates to a stator assembly for an axial flux motor. The disclosure relates in particular to an axial flux motor for a high-voltage fan having a stator assembly of this type, and to a high-voltage fan having a corresponding axial flux motor. Moreover, the present disclosure relates to a method for producing a stator assembly for an axial flux motor.

BACKGROUND

Electric machines have always been used for generating kinetic energy in many fields of technology. An electric machine (also referred to as an electric motor or e-motor) is an electric apparatus which can convert electric energy into mechanical energy. In turn, kinetic energy, by which other apparatuses can be driven, can be generated by the mechanical energy. The electric motor herein generally comprises a stator and a rotor which are accommodated in a motor housing. The stator is fixed in terms of its position, and the rotor moves relative to the stator and usually sits on a drive shaft which co-rotates with the rotor. The rotational energy can be transmitted to other apparatuses by way of the shaft. Most electric motors generate energy by way of a magnetic field and a current in the windings.

In general, a distinction can be made between radial flux machines and axial flux machines:

In radial flux machines, the rotor is typically composed of a cylindrical body, the entire circumference of the latter supporting magnets. The stator is typically configured to be hollow-cylindrical and surrounds the rotor so as to be radially spaced apart therefrom. The stator on the inside thereof supports a plurality of winding elements which are distributed over the circumference. Each winding element comprises in each case one stator tooth which, proceeding from a stator yoke, extends in the radial direction toward the rotor. The stator tooth is wound with a wire of a metallic material of good conductivity in order to form the winding. When the windings are energized by a current, the rotor fastened to the output shaft of the motor is exposed to a torque resulting from the magnetic field, whereby the magnetic flux generated in a radial flux machine is a radial flux.

In axial flux machines, the rotor is typically composed of a disk-shaped rotor body with two circular faces which are connected by a thickness, wherein the disk is delimited by an outer collar and an inner circumference that delimits a space for a rotating shaft. Usually, at least two permanent magnets are attached to at least one of the two circular faces, also referred to as contact face, of the rotor body. The stator is typically designed in the shape of a disk and is disposed so as to be fixed at an axial spacing from the rotor. The stator, on its side facing the rotor, supports a plurality of winding elements which are distributed over the circumference. Each winding element comprises in each case one stator tooth which, proceeding from a stator yoke, extends in the radial direction toward the rotor. The stator tooth is wound with a wire of a metallic material of good conductivity in order to form the winding. When the windings are energized by a current, the rotor fastened to the output shaft of the motor is exposed to a torque resulting from the magnetic field, whereby the magnetic flux generated in an axial flux machine is an axial flux. In axial flux machines, the rotor and the stator are spaced apart in the axial direction by an axial gap, and are therefore also often referred to as axial gap machines. The rotor of an axial flux machine can be driven by one stator on one side of the rotor, or by two stators on both sides of the rotor. In a rotor with a single air gap, which is specified to be operated by a single stator, a single circular face of the rotor body often supports the magnets. In a rotor with two air gaps, which is specified to be operated by two stators, both circular faces often support the magnets. The magnets are in each case held on the circular face by holding means, whereby a spacing is left between the at least two magnets on the same face. In both variants, the same magnets can also be mounted in the rotor body in such a manner that said magnets lie flush on one circular face or both circular faces. This can be achieved, for example, by pockets or windows for receiving the magnets, which are configured so as to be recessed axially into one circular face or both circular faces, or so as to continue axially through said one circular face or both circular faces. Fixing the permanent magnets herein is a challenge.

The continuous refinement of electric motors and the trend toward utilizing electric current as the energy carrier and energy source leads to the application portfolio of electric motors being continuously expanded. Electric motors are not only used in small electronic apparatuses such as notebooks or domestic appliances which are usually operated in the low-voltage range. Electric motors of larger sizes are increasingly also being found in applications in the high-voltage range with operating voltages of up to 800 Volts or 850 Volts or more.

Electric motors, in particular in high-voltage applications, usually generate heat during operation. In the operation of an axial flux motor, the magnetic forces can cause axial forces between the stator and the rotor—in addition to providing the torque. It is a challenge to sufficiently fix the stator in relation to axial forces that occur in the operation of the axial flux motor. Moreover, heat-related thermal expansion in the stator can lead to thermal cycle stresses in the stator.

It is an object of the present invention to provide a stator assembly for an axial flux motor with reliable fastening of the stator.

SUMMARY OF THE INVENTION

The present invention relates to a stator assembly for an axial flux motor, as claimed in claim 1.

The stator assembly according to the invention for an axial flux motor having a rotation axis comprises a stator receptacle portion, a stator and a potting body. The stator receptacle portion is part of a motor housing of the axial flux motor. The stator receptacle portion defines a disk-shaped contact face for receiving the stator. The stator is disposed on the disk-shaped contact face. Moreover, the stator is potted in the stator receptacle portion. The potting body herein is connected to the stator receptacle portion in a form-fitting manner in such a way that the stator in the stator receptacle portion is secured by the potting body at least in the axial direction.

In design embodiments of the stator assembly, the potting body can be connected to the stator receptacle portion in a form-fitting manner by way of one groove or a plurality of grooves.

In design embodiments, the one groove or the plurality of grooves can be recessed into the stator receptacle portion in the radial direction and/or in the axial direction. In design embodiments, the one groove or the plurality of grooves can be recessed into the stator receptacle portion and configured in such a manner that the one groove or the plurality of grooves defines/define an undercut for the potting body to engage with in the axial direction.

In design embodiments, the potting body can engage in the one groove or the plurality of grooves. Securing the stator in the axial direction can thus be enabled as a result of the grooves and the axial engagement of the potting body.

In design embodiments, the potting body can be conceived to secure the stator in terms of rotation. In design embodiments, the one groove or the plurality of grooves can extend in a substantially ring-shaped manner in the circumferential direction.

In design embodiments, the one groove or the plurality of grooves can extend over a range of approximately between 30° and approximately 360°.

In design embodiments which may be combined arbitrarily with any of the preceding design embodiments, the stator receptacle portion can comprise an axial end wall which defines the disk-shaped contact face.

In design embodiments, the axial end wall can be configured to be substantially disk-shaped.

In design embodiments, at least one groove can be recessed into the axial end wall in the axial direction.

In design embodiments, the stator receptacle portion can furthermore comprise a radially inner ring-shaped wall and a radially outer ring-shaped wall. The radially inner ring-shaped wall and the radially outer ring-shaped wall, conjointly with the axial end wall, can delimit a ring-shaped depression.

In design embodiments, the radially inner ring-shaped wall and the radially outer ring-shaped wall can extend in the axial direction away from the axial end wall.

In design embodiments, at least one of the one groove or the plurality of grooves can be recessed radially into the radially inner ring-shaped wall and/or into the radially outer ring-shaped wall.

In design embodiments, at least one groove can be recessed radially inwardly into the radially inner ring-shaped wall.

In design embodiments, at least one groove can be recessed radially outwardly into the radially outer ring-shaped wall.

In design embodiments, at least one of the one groove or the plurality of grooves can be disposed only within an axial region which, proceeding from the axial end wall, extends in the axial direction by up to 50% of a maximum axial width of the potting body. In particular, at least one of the one groove or plurality of grooves can be disposed only within an axial region which in the axial direction extends away from the axial end wall by up to 30% of a maximum axial width of the potting body.

In design embodiments, at least one of the one groove or the plurality of grooves can extend at least up to 10%, preferably at least up to 5%, and particularly preferably at least up to 2%, of a maximum axial width of the potting bodies in the axial direction in front of the axial end wall.

In design embodiments, at least one of the one groove or the plurality of grooves can extend in the axial direction away from the axial end wall by at most up to 30%, preferably by at most up to 25%, and particularly preferably by at most up to 20%, of a maximum axial width of the potting bodies.

In design embodiments which may be combined arbitrarily with any of the preceding design embodiments, the stator assembly can furthermore comprise a cooling device. The cooling device can be disposed in or axially adjacent to the stator receptacle portion. In design embodiments, the cooling device can comprise at least one cooling duct. In design embodiments, the cooling duct can extend in a substantially ring-shaped manner in the circumferential direction in the stator receptacle portion.

In design embodiments, the cooling device can be disposed in or axially adjacent to the axial end wall.

In design embodiments, the stator can be disposed so as to be in direct contact with the axial end wall.

In design embodiments, the stator can be disposed so as to be radially within the radially outer ring-shaped wall. In design embodiments, the stator can be disposed so as to be radially outside the radially inner ring-shaped wall.

In design embodiments which may be combined arbitrarily with any of the preceding design embodiments, the stator can comprise a ring-shaped stator yoke and a plurality of stator teeth. The stator teeth can extend from the stator yoke in the axial direction so as to be distributed in the circumferential direction.

In design embodiments, the stator yoke and the stator teeth can be produced from a wound metallic laminated core.

In design embodiments, the stator can furthermore comprise a plurality of electrical windings. The electrical windings can in each case be wound about the stator teeth.

In design embodiments which may be combined arbitrarily with any of the preceding design embodiments, the stator assembly can furthermore comprise a centering device. The centering device can position the stator coaxially with the rotation axis in the stator receptacle portion. In design embodiments, the centering device can be conceived to secure the stator in terms of rotation in the stator receptacle portion.

In design embodiments which may be combined arbitrarily with any of the preceding design embodiments, the potting body can comprise a resin material. The potting body can in particular comprise a synthetic resin material.

The present invention furthermore relates to an axial flux motor for a fan, wherein the axial flux motor comprises a stator assembly according to any of the preceding design embodiments. Moreover, the axial flux motor comprises a motor housing, a shaft and at least one rotor. The shaft is rotationally mounted in the motor housing. The at least one rotor is disposed so as to be rotationally fixed on the shaft in the motor housing. The stator is disposed so as to be axially adjacent to the rotor in the motor housing. A gap in the axial direction between the stator and the rotor is in particular formed.

In design embodiments of the axial flux motor the rotor can be configured to be disk-shaped. The rotor can comprise a plurality of permanent magnets which are disposed so as to be distributed in the circumferential direction.

In design embodiments of the axial flux motor, the axial flux motor can comprise two stator assemblies. The rotor can be disposed so as to be axially between the stators of the two stator assemblies.

In design embodiments of the axial flux motor, the axial flux motor can be configured as a high-voltage axial flux motor for a high-voltage fan. The axial flux motor can in particular be configured as a high-voltage axial flux motor for a high-voltage fan of an electric vehicle.

The present invention furthermore relates to a high-voltage fan. The high-voltage fan comprises an axial flux motor according to any of the preceding design embodiments. Moreover, the high-voltage fan comprises a fan impeller. The fan impeller is disposed so as to be rotationally fixed on the shaft outside the motor housing.

The present invention furthermore relates to a method for producing a stator assembly for an axial flux motor. The method comprises the following steps. Providing a stator receptacle portion of a motor housing of the axial flux motor, wherein the stator receptacle portion defines a disk-shaped contact face for receiving the stator. Providing a stator. Placing the stator on the disk-shaped contact face. Filling potting compound into a ring-shaped depression. The ring-shaped depression is at least partially defined by the disk-shaped contact face. The potting compound is filled between the stator and the stator receptacle portion, as a result of which, by curing the potting compound, a potting body is provided. The potting body herein is connected to the stator receptacle portion in a form-fitting manner in such a way that the stator in the stator receptacle portion is secured by the potting body at least in the axial direction.

In design embodiments of the method, the stator can be wound with electrical windings prior to being incorporated into the ring-shaped depression. In this instance, the stator can be placed as a wound stator on the disk-shaped contact face.

In design embodiments of the method, the wound stator can be potted with the potting compound and as a result be fixed in the potting body once the potting compound has cured.

In design embodiments of the method, the potting compound can be poured into one groove or a plurality of grooves which are recessed into the stator receptacle portion, so as to establish the form-fitting connection to the stator receptacle portion once the potting compound has cured.

In design embodiments of the method, the potting compound can be potted in such a manner that one elevation or a plurality of elevations complementing the one groove or the plurality of grooves are formed in the potting body after curing.

In design embodiments of the method, a resin material can be used as the potting compound. A synthetic resin material can in particular be used as the potting compound. In design embodiments of the method, the potting compound can comprise fillers promoting thermal conductivity.

BRIEF DESCRIPTION OF THE FIGURES

Further features can be seen in the appended drawings which form part of this disclosure. The drawings are intended to explain the present disclosure in more detail and to enable the person skilled in the art to implement the present disclosure in practice. However, the drawings are not intended to be understood as limiting examples. The same reference signs in the various figures denote identical or equivalent features.

DETAILED DESCRIPTION

Design embodiments of the stator assembly, of the axial flux motor, of the high-voltage fan and of the method according to the present disclosure will be explained hereunder with reference to the drawings.

Figure 3:
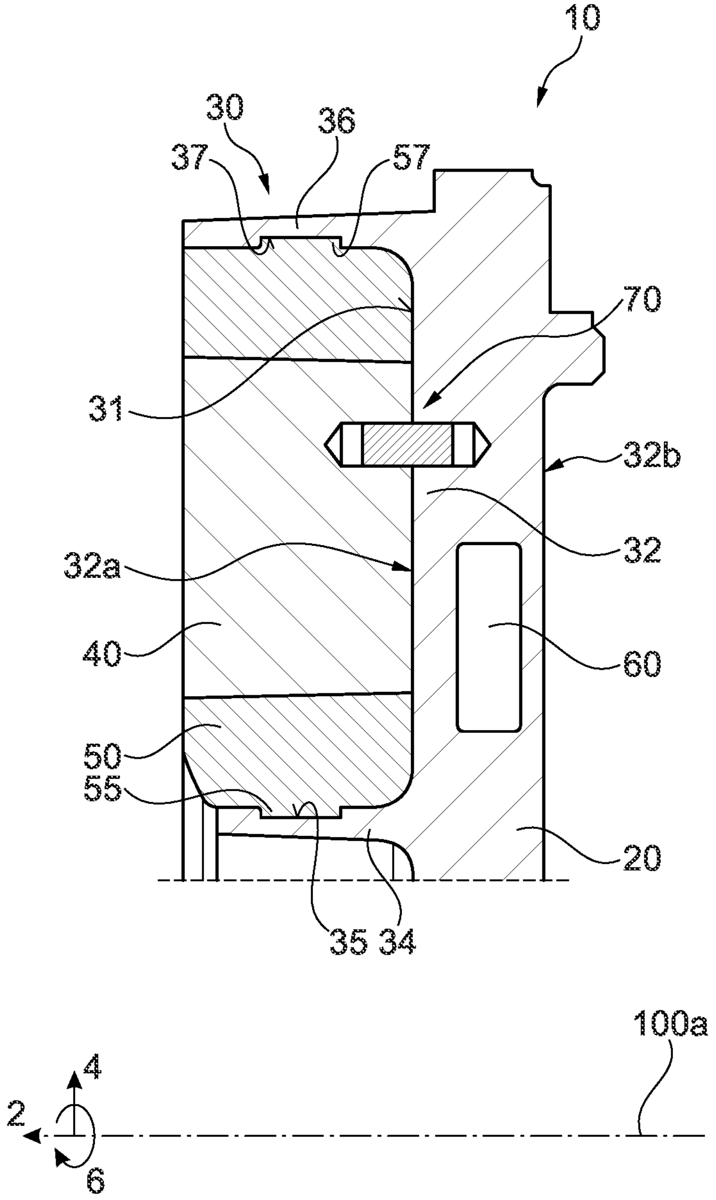
FIG. 3 shows a schematic detail of the stator assembly along a section through a plane which is defined by the axial direction and the radial direction.
Figure 4:
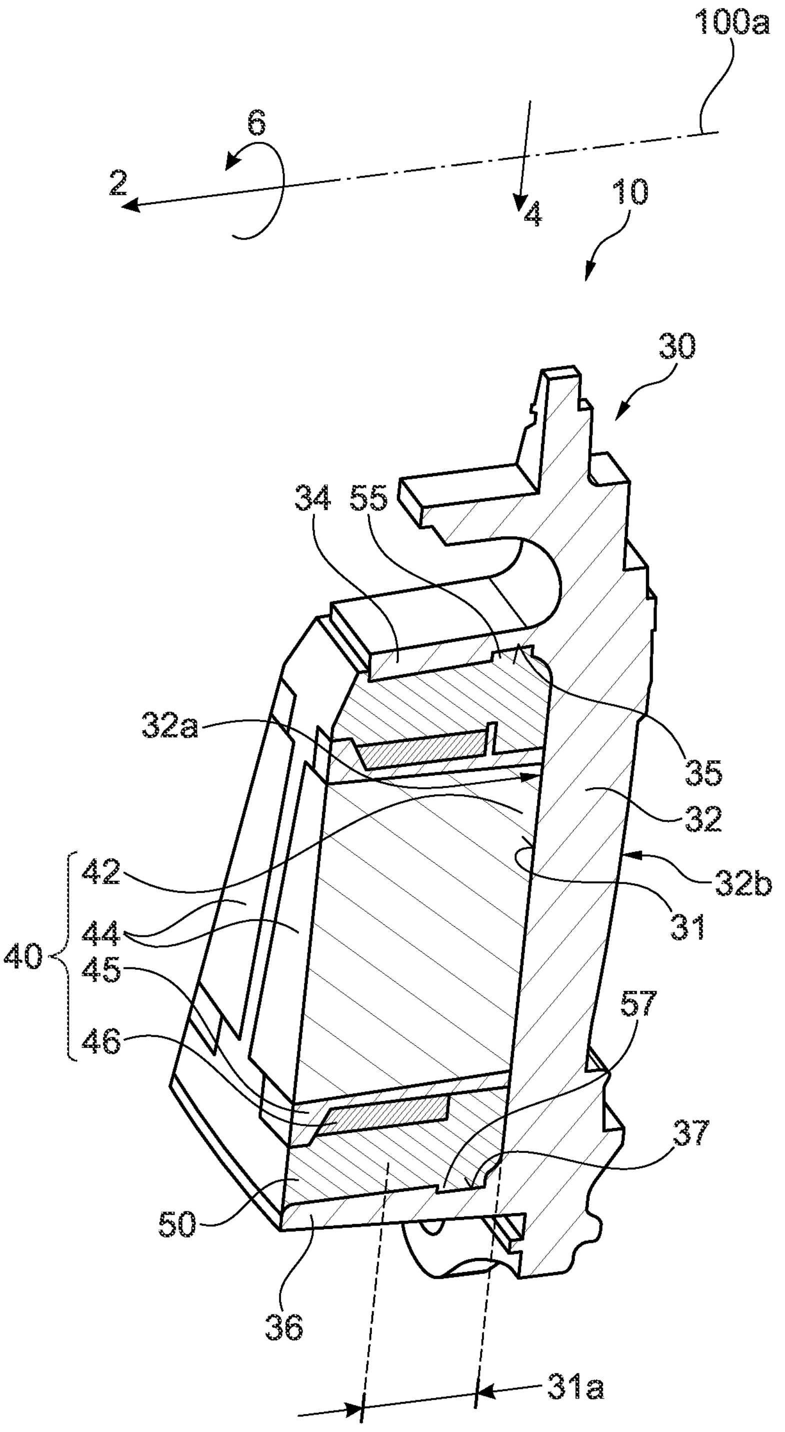
FIG. 4 shows a segmented detail of the stator assembly in a perspective illustration.

In the context of this application, the terms axial or axial direction refer to a rotation axis 100*a* of the axial flux motor 1, or to an axis of the stator assembly 10, or of the stator 40, the latter being disposed so as to be concentric to the rotation axis 100*a*. In the figures (cf. e.g. FIGS. 1 to 6), the axial direction 2 of the stator 40, or of the axial flux motor 1, is represented by the reference sign 2. The expression radial or radial direction is to be understood to refer to the axis/axial direction 2 of the stator 40 and is represented by the reference sign 4. Likewise, a circumference, circumferential, or a circumferential direction refers to the axis/axial direction 2 of the stator 40 and is represented by the reference sign 6. While only one respective exemplary direction is illustrated in each figure, it is to be understood that the respective opposite direction is also included in the respective expression. For example, the circumferential direction 6 in FIG. 4 is represented by an arrow oriented in the counterclockwise direction. However, a direction in the clockwise direction about the axis 2 can also be referred to as the circumferential direction 6. This applies in an analogous manner also to the axial direction 2 and the radial direction 4.

Figure 1:
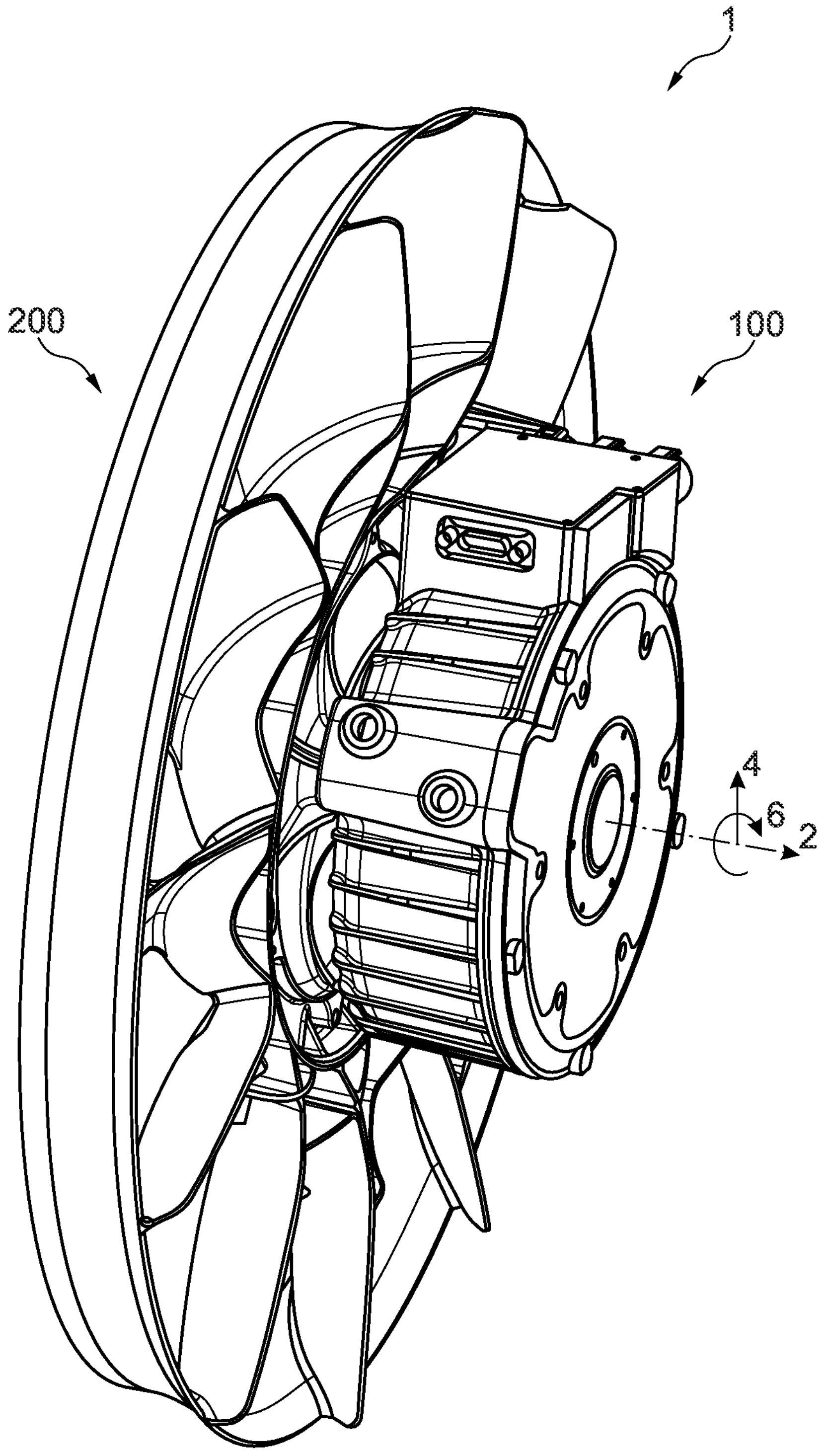
FIG. 1 shows a perspective illustration of the fan according to the invention, with an axial flux motor.

Illustrated in FIG. 1 is an exemplary high-voltage fan 1 according to the present invention. The fan 1 comprises an axial flux motor 100 and a fan impeller 200. The fan impeller 200 can be driven by the axial flux motor 100. For this purpose, the fan impeller 200 is disposed so as to be rotationally fixed on a shaft 112 of the axial flux motor 100 outside a motor housing 20 of the axial flux motor 100. For the purpose of visualization, only the motor housing 20 of the axial flux motor 100 and the fan impeller 200 can be seen in the perspective illustration of FIG. 1. In design embodiments, the high-voltage fan 1 can moreover comprise a cooling device 60 (cf. FIG. 2). In this context, cooling ports for the supply and discharge of cooling fluid for cooling the axial flux motor can be seen in FIG. 1. Moreover illustrated are electrical connectors of the axial flux motor 100.

Figure 2:
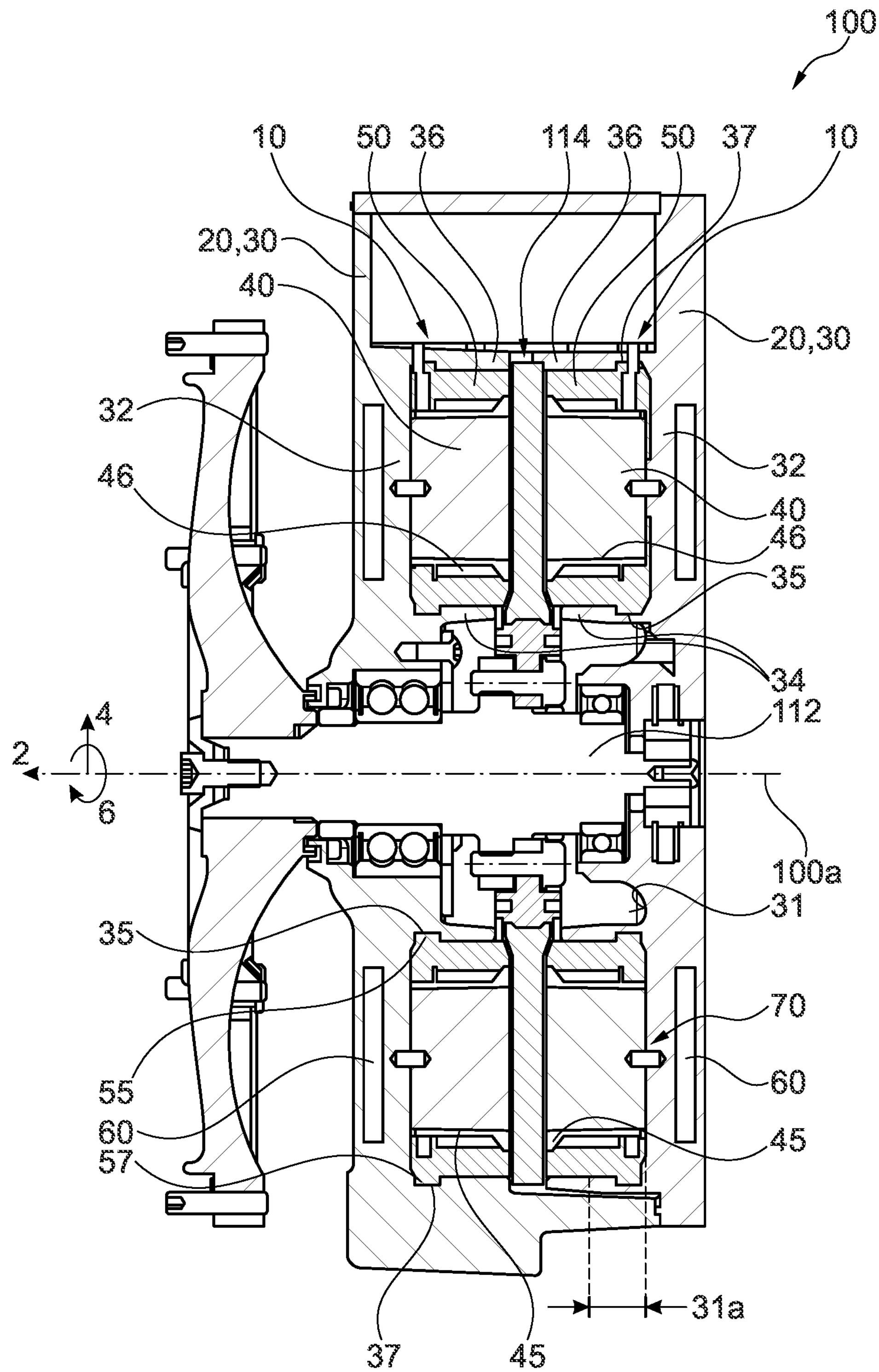
FIG. 2 shows a schematic sectional illustration of the axial flux motor.

FIG. 2 shows the axial flux motor 100 for the high-voltage fan 1 in a schematically simplified sectional illustration along a section line through a plane which is defined by the axial direction 2 and the radial direction 4. In the exemplary embodiment, the axial flux motor 100 comprises a motor housing 20, a shaft 112, a rotor 114 and two stator assemblies 10 according to the present invention. In this design embodiment, the stator assemblies 10 are in each case disposed on one side of the rotor 114 so as to be axially adjacent to the latter. The shaft 112 is rotationally mounted in the motor housing 20. The rotor 114 is disposed so as to be rotationally fixed on the shaft 112 in the motor housing 20. The rotor 114 is disposed so as to be axially between stators 40 of the two stator assemblies 10. A respective gap in the axial direction 2 between the stators 40 and the rotor 114 is formed in particular. In other embodiments, the axial flow motor 100 can comprise more than one rotor 114 and/or more than two stators 40 (not illustrated). For example, the axial flux motor 100 can comprise at least three stators 40 and at least two rotors 114 (not illustrated). In addition, the rotors 114 can in each case be disposed between two stators 40. In design embodiments, the axial flux motor 100 can also comprise only one rotor 114 and one stator 40, in particular only one stator assembly 10.

As is illustrated in FIG. 2, the rotor 114 is configured to be disk-shaped. Disk-shaped can be understood to mean that a radial diameter dimension (diameter at the external circumference) of the rotor 114 is a multiple of the axial thickness dimension of the rotor 114 (axial thickness). For example, the radial diameter dimension can be at least four times, in particular eight times, and in particular ten times, the axial thickness dimension. In embodiments, the ratio of maximum diameter of the rotor 114 to maximum axial thickness of the rotor 114 can be approximately 12+/−1. Furthermore, disk-shaped can also be understood to mean substantially round, in particular circular. Alternatively, disk-shaped may also include polygonal.

The rotor 114 can comprise a plurality of permanent magnets which are disposed so as to be distributed in the circumferential direction 6 (not visible in the sectional image of FIG. 2). The permanent magnets can in particular be magnetized in the axial direction 2. In particular, the permanent magnets can be magnetized in an alternating manner in opposite axial directions 2. In other words, the plurality of permanent magnets can be magnetized in an alternating manner. The permanent magnets can be configured in such a manner that they form in each case at least one magnetic pole in the axial direction 2. The permanent magnets herein can in each case be configured so as to form magnetic poles on one side, or form magnetic poles on two sides. The permanent magnets can be configured so as to form magnetic poles on two sides in particular when a stator 40 is disposed on both sides of the rotor 114, or permanent magnets can be provided for each side of the rotor, as is well known to the person skilled in the art. In design embodiments, the permanent magnets can each be formed by a stack of magnetic plates which are stacked in the radial direction 4. This means that one stack of magnetic plates forms in each case one permanent magnet which is axially magnetized, forming in particular a magnetic pole on two sides. The permanent magnets can be produced from a material which comprises one or a plurality of the elements neodymium, iron, boron, dysprosium, samarium and cobalt. In examples, the permanent magnets can comprise NeFeB or SmCo. In some embodiments, the stack of laminated magnetic plates can be coated. In examples, the coating can comprise nickel and/or epoxy.

The fan 1 according to the invention, or the components thereof, are configured as a high-voltage fan 1. The axial flux motor 100 herein can in particular be conceived as a high-voltage axial flux motor 100. This means that the axial flux motor 100 is dimensioned for applications in the high-voltage sector with operating voltages of up to 800 Volts and more. The fan 1 can be used in particular for cooling components of an electric vehicle (for example a battery-operated electric vehicle, in particular a motor vehicle such as a passenger motor vehicle or a commercial vehicle). Alternatively, the fan 1 can also be used in additional (in particular mobile) applications in which a high (cooling) output is required. These include in particular also applications with an electric motor and/or internal combustion engine. For example, the fan 1 can be used in applications with drive motors of similar dimensions, such as in an electric vehicle. Applications of this type can also include, for example, machines or vehicles with internal combustion engines and/or electric motors such as construction machinery, generators or cranes, to mention only a few examples.

As has already been mentioned, the axial flux motor 100 from FIG. 2 comprises two stator assemblies 10. Details of the stator assembly 10 are illustrated in detail in particular in FIGS. 3, 4, 5 and 6. The stator assemblies 10 are to be discussed in more detail hereunder.

The stator assembly 10 comprises a stator receptacle portion 30, a stator 40 and a potting body 50. As can be readily seen in FIG. 2 in particular, the stator receptacle portion 30 can form part of a motor housing 20 of the axial flux motor 100. In other words, the motor housing 20 comprises the stator receptacle portion, or the stator receptacle portions 30. The stator receptacle portion 30 defines a disk-shaped contact face 32*a* for receiving the stator. More specifically, the stator receptacle portion 30 comprises an axial end wall 32. The axial end wall 32 defines the disk-shaped contact face 32*a*. The stator 40 is disposed on the disk-shaped contact face 32*a*. Moreover, the stator 40 is potted in the stator receptacle portion 30. The potting body 50 is formed as a result of the potting. Moreover, as a result of the potting, the stator 40 can be fixed in the potting body 50, in particular in a form-fitting and/or friction-fitting manner. The potting body 50 herein is connected to the stator receptacle portion 30 in a form-fitting manner in such a way that the stator 40 in the stator receptacle portion 30 is secured by the potting body 50 at least in the axial direction 2.

The axial end wall 32 can in particular be understood to be a wall which extends predominantly in a plane that runs orthogonally to the axial direction 2, or is formed by a plurality of radial directions 4. The axial end wall 32 can be understood to be axially delimiting. In other words, the stator 40 can be delimited by the axial end wall 32 in the axial direction 2. In particular, the stator 40 can rest on the axial end wall 32 in the axial direction 2. As can be seen in the detail of FIG. 3, for example, the axial end wall 32 can comprise a first axial face 32*a* and a second axial face 32*b*. The second axial face 32*b* is disposed opposite the first axial face 32*a*. The first axial face 32*a* is oriented in the direction of the stator 40. In other words, the first axial face 32*a* defines the disk-shaped contact face 32*a*. In particular, the axial end wall 32 can be configured so as to be substantially disk-shaped. Disk-shaped can be understood to mean that the element (presently the axial end wall 32) has an axial thickness which is smaller by a multiple than respective lateral dimensions (for example orthogonal to the thickness in the radial direction 4). An axial thickness can be understood to be a dimension in the axial direction 2. The axial thickness of the end wall 32 is thus defined between the first axial face 32*a* and the second axial face 32*b*. Disk-shaped can be substantially round, for example. In examples of this type, an extent of the axial end wall 32 in the radial direction 4 can be larger by a multiple than the axial thickness, for example at least by a factor of 2, 3, 4, 5 or more. In other words, a disk-shaped element can be delimited by an outer radius and an inner radius and therebetween have a radial width. The radial width can be larger by a multiple than the axial thickness, for example at least by a factor of 2, 3, 4, 5 or more. As is illustrated in FIG. 2, the axial end wall 32 can in particular also be an end wall of the axial flux motor 100, or of the motor housing 20. In some design embodiments, the axial end wall 32 can comprise a cover of the motor housing 20, or be configured as said cover.

As can be best seen in FIGS. 2 and 4, the stator 40 can comprise a ring-shaped stator yoke 42 and a plurality of stator teeth 44. Furthermore, the stator 40 comprises a plurality of electrical windings 46. The electrical windings 46 can in each case be wound about the stator teeth 44. When the electrical windings 46 are energized by a drive current, a magnetic field which is suitable for acting on the rotor 114 in order to drive the latter can be generated. The stator teeth 44 can extend from the stator yoke 42 in the axial direction 2, so as to be distributed in the circumferential direction 6. The stator yoke 42 can in particular be disposed on the first axial face 32*a* of the axial end wall 32. In some design embodiments, the stator 40, or the stator yoke 42, can at least partially be disposed in a centering depression (not illustrated) which is recessed into the axial end wall 32, or into the disk-shaped contact face 32*a*, in the axial direction 2. In some design embodiments, the stator 40, or the stator yoke 42, can at least partially rest on the axial end wall 32, or on the disk-shaped contact face 32*a*, by way of a thermally conductive material. In other words, a thermally conductive material can be disposed at least in portions between the stator 40 and the axial end wall 32. In design embodiments, the thermally conductive material can comprise a thermally conductive layer and/or a thermally conductive paste. In design embodiments that have a centering depression, the thermally conductive material can be at least partially, in particular completely, disposed in the centering depression. In design embodiments with or without a centering depression, the thermally conductive material can extend over an entire radial width of the stator 40. In design embodiments, the thermally conductive material can extend in the radial direction 4 in one or a plurality of radial portions. In design embodiments, the thermally conductive material can extend partially or completely in the circumferential direction 6 in one or a plurality of circumferential portions. In particular, the thermally conductive material can extend completely, i.e. by 360°, in the circumferential direction. The stator teeth 44 can in particular extend away from the stator yoke 42 in the axial direction 2. In other words, the stator teeth 44 extend in an axial direction 2 which points away from the axial end wall 32, in particular from the first axial face 32*a* of the axial end wall 32. In design embodiments, the stator yoke 42 and the stator teeth 44 can be produced from a wound metallic laminated core. Alternatively, the stator yoke 42 and the stator teeth 44 can also be produced by power metallurgy, or by other production methods known to the person skilled in the art. The combination of the stator yoke 42 and the stator teeth 44 can also be referred to as the stator core. In design embodiments, the stator core can be produced from laminated layers of a ferritic material, in particular an iron material.

In design embodiments, one pole shoe for retaining the electrical windings 46 in grooves can in each case be formed on axial ends of the stator teeth 44, wherein the grooves are in each case formed between two adjacent stator teeth 44 in the circumferential direction 6. The electrical windings 46 can have a round cross section. In alternative design embodiments, the electrical windings 46 can have a rectangular cross section. The electrical windings 46 can comprise multi-layer windings. In design embodiments, the electrical windings 46 can be insulated. As can be seen in FIGS. 2 and 4, in some design embodiments the stator 40 can have a casing 45 which at least partially encases at least the stator teeth 44. In particular, the casing 45 may not be disposed on an axial end face of the stator teeth 44 (cf. FIG. 2). The casing 45 can comprise a plastic overmolding. The casing 45 can be disposed, in particular for electrical isolation, between the stator teeth 44 and the electrical windings 46. The casing 45 can comprise positioning elements so as to simplify a positioning of the electrical windings 46 in comparison to stator teeth 44 that do not comprise any position element. The casing 45 can comprise pole shoes, for example.

Figure 5:
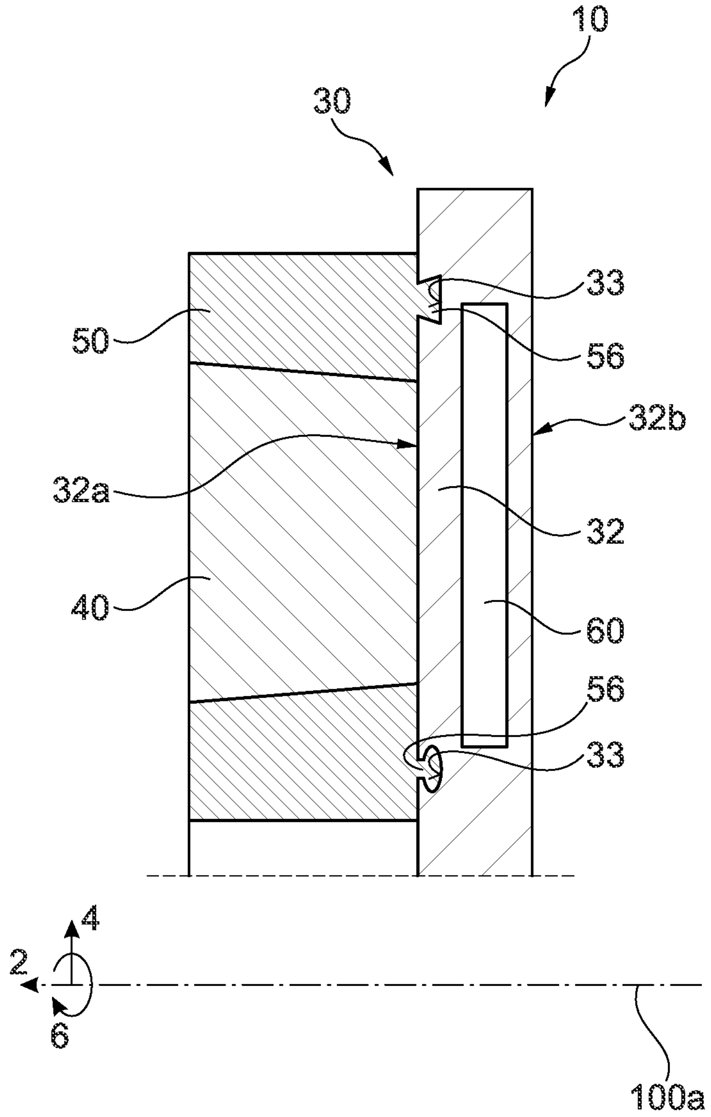
FIG. 5 shows a detail of the stator assembly along a section through a plane which is defined by the axial direction and the radial direction, in one variant of design embodiment.
Figure 6:
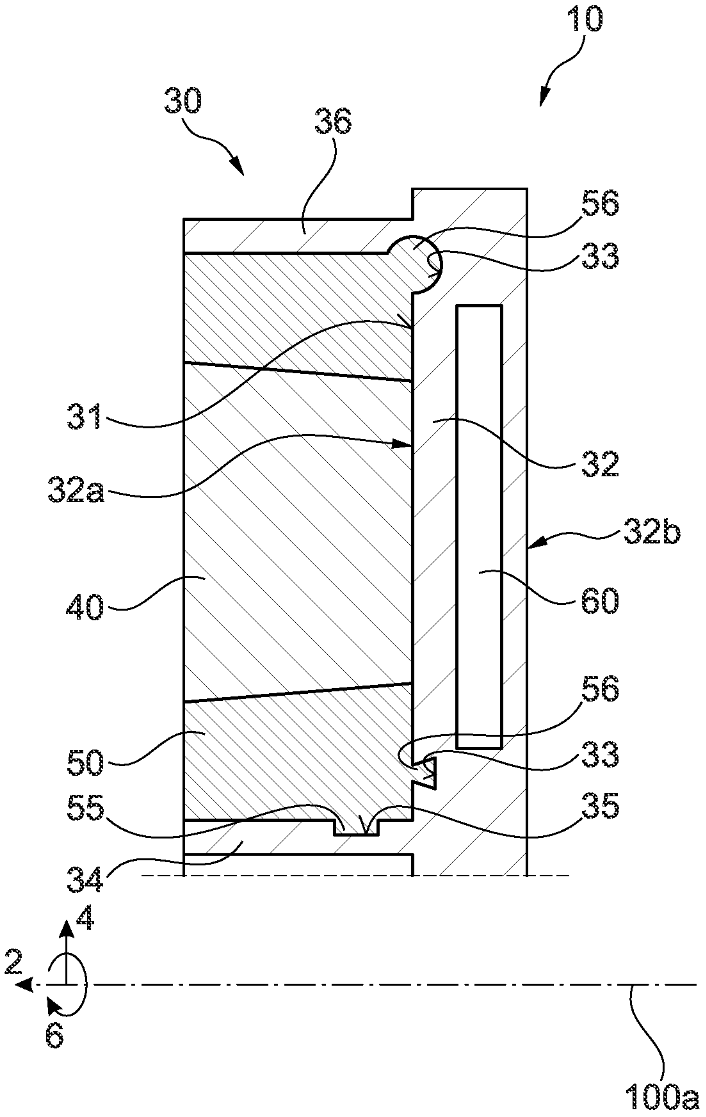
FIG. 6 shows a detail of the stator assembly along a section through a plane which is defined by the axial direction and the radial direction, in one variant of design embodiment.

It is to be understood that FIGS. 3, 5 and 6 represent highly simplified and schematic images of the stator assembly 10. Even when not explicitly shown, the stator assemblies 10 illustrated in these figures may also comprise some or all of the features explained in this description, or features relating to the stator 40, respectively.

As is shown in an exemplary manner in the embodiments of FIGS. 2, 3, 4 and 6, the stator receptacle portion 30 can furthermore comprise a radially inner ring-shaped wall 34 and a radially outer ring-shaped wall 36. The radially inner ring-shaped wall 34 and the radially outer ring-shaped wall 36, conjointly with the axial end wall 32, can delimit a ring-shaped depression 31. In other words, the stator receptacle portion 30 can define the ring-shaped depression 31 for receiving the stator 40. In particular, the stator 40 and the potting compound 50 can be disposed in the ring-shaped depression 31. The axial end wall 32, the radially inner ring-shaped wall 34 and/or the radially outer ring-shaped wall 36 delimit the ring-shaped depression 31 axially as well as radially inwardly and/or radially outwardly (depending on whether one or both ring-shaped walls 34, 36 is/are provided). The ring-shaped depression 31 is understood to be axially recessed, extending in the circumferential direction 6 about the rotation axis 100*a* of the axial flux motor 100. The first axial face 32*a* is oriented in the direction of the ring-shaped depression 31. In other words, the first axial face 32*a* defines a sub-region of the ring-shaped depression 31.

In alternative design embodiments, the stator receptacle portion 30 can also comprise only one of the radially inner ring-shaped wall 34 or the radially outer ring-shaped wall 36. In design embodiments as shown in FIG. 5, the stator receptacle portion 30 may also comprise neither the radially inner ring-shaped wall 34 nor the radially outer ring-shaped wall 36.

As is illustrated in FIGS. 2, 3, 4 and 6, the radially inner ring-shaped wall 34 and the radially outer ring-shaped wall 36 extend in the axial direction 2 away from the axial end wall 32. The radially inner ring-shaped wall 34 and the radially outer ring-shaped wall 36 can be understood to be substantially hollow-cylindrical elements. In particular, the radially inner ring-shaped wall 34 and the radially outer ring-shaped wall 36 can protrude from the axial end wall 32. The stator receptacle portion 30 with the walls 32, 34, 36 can be produced integrally, in particular integrally and in one piece. Alternatively, the stator receptacle portion 30 can be constructed from multiple parts, i.e. from two or more parts. Integral can understood to be a single structure even if the elements forming the structure may have originally been composed of a plurality of parts, for example produced by welding or soldering/brazing. Integral and in one piece can be understood to be a specification of "integral", wherein the elements forming the structure were not originally separated, for example produced by casting, additive manufacturing, sintering or injection molding.

As can be seen in particular in FIGS. 3 and 4, the stator 40 can be disposed radially within the radially outer ring-shaped wall 36. The stator 40 can be disposed radially outside the radially inner ring-shaped wall 34. The potting body 50 can be disposed radially between the radial ring-shaped walls 34, 36 and the stator 40.

In other words, the potting body 50 can be disposed radially within and radially outside the stator 40 (cf. FIGS.

2, 3, 4, 5 and 6). As has already been mentioned earlier, as a result of the potting, the stator 40 in the stator receptacle portion 50 can be fixed in a friction-fitting and/or form-fitting manner in the potting body 50, or by the potting body 50, respectively. For example, as a result of the potting, the stator 40 can be embedded in the potting body 50. In particular, the stator 40 can be embedded at least radially in the potting body 50. More specifically, the stator 40 can be embedded inwardly in the radial direction 4 and outwardly in the radial direction 4 in the potting body 50. Moreover, the stator 40 can be embedded in the circumferential direction 6 in the potting body 50. For example, the potting body 50 can be disposed between the stator teeth 44 in the circumferential direction 6, and/or between the electrical windings 46 in the circumferential direction 6 and/or between the casings 45 in the circumferential direction 6.

The stator assembly 10 can furthermore comprise a cooling device 60, as is illustrated in the design embodiments of FIGS. 2, 3, 5 and 6. In the examples shown, the cooling device 60 is disposed in the stator receptacle portion 30. More specifically, the cooling device 60 is disposed in the axial end wall 32. Alternatively or additionally, the cooling device 60 can be disposed in or radially adjacent to the radially inner ring-shaped wall 34 and/or the radially outer ring-shaped wall 36. In alternative design embodiments, the cooling device 60 can be disposed axially adjacent to the stator receptacle portion 30. In the exemplary embodiments illustrated, the cooling device 60 is configured as a cooling duct. The cooling duct can be configured as a cooling duct with fluid cooling. In other words, the cooling device 60 can comprise cooling fluid cooling. The cooling duct can extend so as to be substantially ring-shaped in the circumferential direction 6 in the stator receptacle portion 30. In design embodiments, the cooling duct can extend over a region of approximately 360°. In alternative design embodiments, the cooling duct can also extend over a region of less than 360°. For example, the cooling duct can extend in a substantially ring-shaped manner in the circumferential direction 6 over a region of approximately between 30° and approximately 360°. Ring-shaped can in particular be understood to be ring-shaped portions, extending only over a segment of a circle which comprises less than 360°. In alternative design embodiments, the cooling device 60 can comprise a plurality of cooling ducts. Alternatively or additionally to the one or the plurality of cooling ducts, the cooling device can also comprise cooling ribs.

The stator 40 can in particular be disposed so as to be in direct contact with the axial end wall 32. More specifically, the stator 40 can be disposed in a contacting manner on the first axial face 32*a* of the axial end wall 32. This is particularly advantageous in combination with a cooling device 60 in the axial end wall 32. As has already been mentioned earlier, the stator assembly 10 in some design embodiments can furthermore comprise a thermally conductive material (e.g. a thermally conductive paste) which is disposed between the axial end wall 32 and the stator 40. A dissipation of heat to, or by way of, the axial end wall 32 can be improved as a result.

As can best be seen in FIGS. 2 and 3, the stator assembly 10 can furthermore comprise a centering device 70. The centering device 70 can position the stator 40 so as to be coaxial with the rotation axis 100*a* in the stator receptacle portion 30. In design embodiments, the centering device 70 can be conceived to secure the stator 40 in terms of rotation in the stator receptacle portion 30. For example, the centering device 70 can comprise a plurality of pins which engage in corresponding depressions in the stator 40 and in the stator receptacle portion 30, in particular in the stator yoke 42 and in the axial end wall 32. Alternatively or additionally to the pins, the centering device 70 can also comprise one or a plurality of screws which are distributed on the circumference. Apart from the centering function, an anti-rotation protection can also be implemented by the pins or screws. Furthermore, further protection in relation to axial movements can moreover be implemented by the screws. Moreover, axial contact between the stator 40 and the axial end wall 32 can be improved, or an axial contact force be increased, as a result of a threaded connection, this potentially having an advantageous effect on the dissipation of heat. A threaded connection can be implemented, or screwed in, from the cooling duct 60, and or the second axial face 32*b*, for example. Alternatively or additionally, the centering device 70 can comprise a ring-shaped centering depression which is recessed axially into the axial end wall 32. The centering depression can have a radial width which corresponds substantially to a radial yoke width of the stator 40. This can be understood to mean that a radial width of the centering depression corresponds to 100% to 120% of a radial width of the stator yoke 42. The centering depression can be configured to be ring-shaped, like the stator 40. A centering depression can advantageously improve the cooling of the stator 40, in particular when the axial end wall 32 comprises a cooling device 60.

The potting body 50 can in particular comprise a resin material. The potting body 50 can comprise a synthetic resin material, for example. The resin material can optionally be provided with fillers promoting thermal conductivity. In some design embodiments, the resin material can comprise epoxy and/or polyester.

As has already been explained, the potting body 50 is connected to the stator receptacle portion 30 in a form-fitting manner in such a way that the stator 40 in the stator receptacle portion 30 is secured by the potting body 50 at least in the axial direction 2. More specifically, the potting body 50 can be connected to the stator receptacle portion 30 in a form-fitting manner by way of one groove or a plurality of grooves 33, 35, 37. The term groove can in particular be understood to mean a depression, and does not mandatorily have to be of an elongate configuration. In this context, FIGS. 2, 3, 4, 5 and 6 show different design embodiments of the one groove or the plurality of grooves 33, 35, 37. Even while specific design embodiments of grooves are illustrated, it is known to the person skilled in the art that one or a plurality of the illustrated grooves 33, 35, 37 can also be designed differently than depicted. In particular, grooves of the respectively shown stator assemblies 10 can be of dissimilar or identical configuration. Also, more or fewer than the grooves illustrated may be provided.

The one groove or the plurality of grooves 33, 35, 37 can be recessed into the stator receptacle portion 30 in the radial direction 4 and/or in the axial direction 2. Recessed in the radial direction 4 can comprise radially inwardly recessed and/or radially outwardly recessed. An axial retaining force can be provided as a result of a groove being radially recessed. In particular, the one groove or the plurality of grooves 33, 35, 37 can be recessed into the stator receptacle portion 30 and configured in such a manner that the one groove or the plurality of grooves 33, 35, 37 define an undercut for the potting body 50 to engage in the axial direction 2. The potting body 50 can engage in the one groove or the plurality of grooves 33, 35, 37. In particular, the potting body 50 can have one elevation or a plurality of elevations 55, 56, 57 which engages/engage in the one groove or the plurality of grooves 33, 35, 37. Axial securing of the stator 40 can thus be enabled as a result of the grooves 33, 35, 37 and the axial engagement of the potting body 50. In some design embodiments, the potting body 50 can be conceived to secure the stator 40 in terms of rotation. Rotational securing of the stator 40 can be provided, for example, by one groove or a plurality of grooves 33, 35, 37 which are spaced apart in the circumferential direction 6, and a corresponding one elevation or plurality of elevations 55, 56, 57. Alternatively, rotational securing of the stator 40 can be provided by a design embodiment of the one groove or the plurality of grooves 33, 35, 37 which is corrugated or zigzag-shaped in the circumferential direction 6, and a corresponding one elevation or a plurality of elevations 55, 56, 57. A form-fit can be achieved in that the potting body 50 engages in the one groove or the plurality of grooves 33, 35, 37 during potting and cures in the latter. The one elevation or the plurality of elevations 55, 56, 57 of the potting body 50 can be formed in the process. The one elevation or the plurality of elevations 55, 56, 57 can protrude into the one groove or the plurality of grooves 33, 35, 37 in the radial direction 4 and/or the axial direction 2. In other words, the one elevation or the plurality of elevations 55, 56, 57 can be configured so as to be complementary to the one groove or the plurality of grooves 55, 56, 57.

In general, at least one groove 33, 35, 37 can be recessed into the axial end wall 32, the radially inner ring-shaped wall 34 and/or into the radially outer ring-shaped wall 36. In other words, the axial end wall 32, the radially inner ring-shaped wall 34 and/or the radially outer ring-shaped wall 36 can have one groove or a plurality of grooves 33, 35, 37. In some design embodiments, one groove or a plurality of grooves 33, 35, 37 can also extend over two wall portions. Wall portions can be understood to mean the axial end wall 32, the radially inner ring-shaped wall 34 and the radially outer ring-shaped wall 36. This is shown, for example, in the stator assembly 10 of FIG. 6, in which the groove 33 extends in the radially outer ring-shaped wall 36 and in the axial end wall 32. The one groove or the plurality of grooves 33, 35, 37 can have different geometries. More specifically, the one groove or the plurality of grooves 33, 35, 37 can have different suitable cross sections in a plane defined by the axial direction 2 and the radial direction 4, so as to provide an undercut for the engagement of the retaining body 50. Suitable cross sections can be understood to mean cross sections of the type that have at least one portion which is inclined in relation to the axial direction 2. Axial forces can be absorbed as a result. For example, the one groove or the plurality of grooves 33, 35, 37 can have a rectangular, oval, corrugated, semicircular, conical, trapezoidal or polygonal cross section in a plane defined by the axial direction 2 and the radial direction 4.

The exemplary embodiments of the stator assemblies 10 from FIGS. 2, 3, 4, 5 and 6 will be discussed in more detail hereunder, wherein combinations of individual or all features are possible.

The stator assembly 10 of FIGS. 2 and 4 comprises two grooves 35 and 37. A first groove 35 is recessed radially inwardly into the radially inner ring-shaped wall 34 (may also be referred to as radial groove 35 or first radial groove 35). A second groove 37 is recessed radially outwardly into the radially outer ring-shaped wall 36 (may also be referred to as radial groove 37 or second radial groove 37). The two grooves 35, 37 extend in a substantially ring-shaped manner in the circumferential direction 6. A corresponding first elevation 55 and a second elevation 57 of the retaining body 50 are disposed in the first groove 35, or in the second groove 37, respectively. In other words, the first elevation 55 engages radially in the first groove 35. The second elevation 57 engages radially in the second groove 37. The first elevation 55 and/or the second elevation 57 may also be referred to as radial elevations 55, 57. In alternative design embodiments, only one of the first groove 35 or the second groove 37, and a corresponding one of the first elevation 55 or the second elevation 57, can also be provided. Also, a plurality of grooves 55 spaced apart in the circumferential direction 6 and/or in the axial direction 2, and corresponding elevations in the radially inner ring-shaped wall 34 and/or in the radially outer ring-shaped wall 36, could be provided. For example, a plurality of grooves and elevations distributed in the circumferential direction 6 can be provided. The plurality of grooves and elevations distributed in the circumferential direction 6 can conjointly cover, for example, a region of 90° to 360°, preferably of 180° to 360°, in particular preferably of 270° to 360°. Alternatively or additionally, a plurality of grooves and elevations distributed in the axial direction 2 can be provided. At least one of the plurality of grooves and elevations distributed in the axial direction 2 can cover, for example, a region of 90° to 360°, preferably of 180° to 360°, and particularly preferably of 270° to 360°. The one groove or elevation, or the plurality of grooves and elevations, can also be disposed so as to overlap when viewed in the axial direction 2. In some design embodiments, a plurality of grooves and elevations which extend in each case by less than 90° in the circumferential direction 6, for example 5° to 60°, in particular 10° to 45°, or 15° to 30°, can be provided. For example, a multiplicity of grooves and elevations which are distributed in the circumferential direction 6 can be disposed in the stator assembly 10. As has already been mentioned, the grooves can also be configured as depressions which are not elongate. For example, the grooves can be recessed into the radially inner ring-shaped wall 34 and/or into the radially outer ring-shaped wall 36 as a rectangular or circular depressions (for example bores).

The grooves 35, 37 of the stator assembly from FIGS. 2 and 4 are disposed within an axial region 31*a* which extends in the axial direction 2 away from the axial end wall 32 by up to 50% of a maximum axial width of the potting body 50. In particular, the two grooves 35, 37 extend only within an axial region 31*a* which extends in the axial direction 2 away from the axial end wall 32 by up to 30% of a maximum axial width of the potting body 50. Design embodiments of this type are particularly advantageous because the risk of stress cracks in the region of the groove 35, 37 in the event of thermal expansions of the potting body 50 during operation can be reduced in comparison to a groove which is disposed further away from the axial end wall 32. Design embodiments of this type are particularly advantageous in combination with a cooling device 60, for example a cooling device in the axial end wall 32. In other words, a groove disposed close to the axial end wall 32 is more advantageous than a groove which is more remote from the axial end wall 32, in particular if the cooling device 60 is disposed in the axial end wall 32. In particular, at least one of the one groove or the plurality of grooves 35, 37 can extend in the axial direction 2 at least by up to 10%, preferably at least up to 5%, and particularly preferably at least up to 2%, of a maximum axial width of the potting body 50 in front of the axial end wall 32. In design embodiments, at least one of the one groove or the plurality of grooves 35, 37 can extend in the axial direction 2 away from the axial end wall 32 by at most up to 30%, preferably by at most up to 25%, and particularly preferably by at most up to 20%, of a maximum axial width of the potting bodies 50.

Nevertheless, in some design embodiments, at least one groove 35, 37 can also be configured in such a manner that the latter extends in the axial direction 2 away from the axial end wall 32 by more than 50% of a maximum axial width of the potting body 50, as is shown in the exemplary embodiment of schematically simplified FIG. 3. The stator assembly 10 of FIG. 3 can otherwise be configured identically to the stator assemblies 10 of FIGS. 2 and 4. Alternatively, the stator assembly 10 of FIG. 3 can be configured identically to the stator assemblies 10 of FIGS. 2 and 4 in terms of only one feature or a plurality of features.

In some design embodiments, the groove 35, 37 can comprise an axial width of 5 mm to 15 mm, preferably of 8 mm to 12 mm. In particular, only a single groove 35, 37 can be provided in the axial direction 2 in the radially inner ring-shaped wall 34 and/or in the radially outer ring-shaped wall 36. Groove widths of this type, in particular in combination with only one groove in the axial direction 2, have resulted in a better ratio between heat-related stresses, axial retaining force and ease of production.

In some design embodiments, the groove 35, 37 can comprise a radial depth of 0.5 mm to 6 mm, preferably of 2 mm to 4 mm.

In some design embodiments, such as shown in FIG. 3, for example, at least one edge of the groove 35, 37, which is spaced farther apart from the axial end wall 32, can be configured to be radiused. A radius of the radiused edge can be, for example, 0.5 mm to 5 mm, preferably 1 mm to 3 mm, and particularly preferably 2 mm (+/−0.5 mm). As a result, an inflow of the potting compound into the groove 35, 37 can be improved in particular when potting the stator 40 in the stator receptacle portion 30. In other words, the risk of air pockets in the potting body 50 can thus be eliminated or at least reduced. As a result, the reliability of the stator assembly during operation can in turn be improved, and a more reliable stator assembly can be provided. As an alternative to radiusing, a chamfer which is conceived to improve the inflow of potting compound can also be provided. For example, the chamfer can have a width of 0.5 mm to 5 mm, preferably of 1 mm to 3 mm, and particularly preferably of 2 mm (+/−0.5 mm). An angle of the chamfer can be 45°, for example. In design embodiments, the angle of the chamfer can be 30° to 60°. The features mentioned in this paragraph can also be applied in part or completely to other radial grooves 35, 37. Alternatively or additionally, an edge of the groove 35, 37, which is disposed closer to the axial end wall 32, can also be configured to be radiused or chamfered. A chamfered and/or radiused edge of the groove 35, 37, in particular in combination with only a single groove 35, 37 (as mentioned above), leads to an improvement in the production process and to an improvement of the stator assembly 10, or of the potting body 50, in terms of strength and/or reliability.

In some embodiments, the at least one groove 33, 35, 37 can extend up to the axial end wall 32. In other words, the at least one groove 33, 35, 37 can be flush with the axial end wall 32, or be recessed into the axial end wall 32, in at least one portion, as will be explained with reference to FIGS. 5 and 6.

In this context, FIGS. 5 and 6 show a stator assembly 10 having a groove 33 which is disposed in the axial end wall 32. In detail, the groove 33 is recessed into the axial end wall 32 in the axial direction 2. Therefore, the groove 33 may also be referred to as axial groove 33. Alternatively, the groove 33 can also be recessed into the axial end wall 32 so as to be inclined in relation to the axial direction 1. More specifically, the stator assemblies 10 of FIGS. 5 and 6 comprise in each case two axial grooves 33. However, it is conceivable that the stator assemblies 10 of FIGS. 5 and 6 could in each case comprise only one axial groove 33 or more than two axial grooves 33. The axial grooves 33 are in particular configured in such a manner that they define an undercut in the axial direction 2 for the potting body 50 to engage in the axial direction 2. Various geometries are conceivable for this purpose, whereby the groove geometries should have at least one portion which is inclined in relation to the axial direction 2 so as to form an undercut and, as a result, enable an axial engagement of the retaining body 50.

Shown by way of example in the design embodiment of FIG. 5 is a first axial groove 33 having a conical or trapezoidal cross section. The first axial groove 33 is disposed in the axial end wall 32 radially outside the stator 40. A second axial groove 33 is disposed in the axial end wall 32 radially within the stator 40. The second axial groove 33, by way of example, is configured to be oval so as to provide the undercut for the axial mounting. In other words, the axial grooves 33 are configured to provide an undercut for the axial mounting. The potting body 50 can engage in the axial grooves 33. In particular, the potting body 50 can have corresponding elevations 56 (may also be referred to as axial elevations 56) which engage in the axial grooves 33. Axial securing of the stator 40 can thus be enabled as a result of the grooves 33 and the axial engagement of the potting body 50. More specifically, the axial elevations 56 engage in the axial grooves 33 in the axial direction 2 and in the radial direction 4. In other words, the axial elevations 55 can be configured to be complementary to axial grooves 55.

The axial grooves 33 extend so as to be substantially ring-shaped in the circumferential direction 6. A corresponding first elevation 56 and a second elevation 56 of the retaining body 50 are disposed in the first groove 33, or in the second groove 33, respectively. In other words, the first elevation 56 engages axially and radially in the first groove 33. The second elevation 56 engages axially and radially in the second groove 33. In alternative design embodiments, only one axial groove 33 or more than two axial grooves 33 can also be provided. Also, the first axial groove 33 and/or the second axial groove 33 can be configured differently from what is shown. For example, a plurality of grooves 33 which are spaced apart in the circumferential direction 6, and corresponding elevations 56, could be provided in the axial end wall 32. The plurality of grooves 33 and elevations 56 distributed in the circumferential direction 6 can conjointly cover, for example, a region of 90° to 360°, preferably of 180° to 360°, and particularly preferably of 270° to 360°. In some design embodiments, a plurality of grooves 33 and elevations 56 can be provided in the stator assembly 10, in particular in the axial end wall 32, which extend in each case by less than 90° in the circumferential direction 6, for example by 5° to 60°, in particular 10° to 45°, or 15° to 30°. For example, a multiplicity of grooves 33 and elevations 56 can be disposed in the stator assembly 10, in particular in the axial end wall 32, which are distributed in the circumferential direction 6. The one groove and elevation, or the plurality of grooves 33 and elevations 56 which are circumferentially distributed can be disposed so as to overlap when viewed in the radial direction 4. As has already been mentioned, the grooves 33 can also be configured as depressions which are not elongate. For example, the grooves can be recessed as rectangular or circular depressions (for example bores), having corresponding undercuts, into the axial end wall 32. In design embodiments, the one groove or the plurality of grooves 33, 35, 37 may also not extend in a ring-shaped manner in the circumferential direction 6. Axial grooves 33, which are incorporated in the axial end wall 32, can in particular extend or run tangentially to the circumferential direction 6 and/or in the radial direction 4, for example (not illustrated).

A simplification of components, savings in terms of costs and/or weight and/or material, can be achieved by providing axial grooves 33. This can be seen in particular in the design embodiment of the stator assembly from FIG. 5, which does not comprise any radially ring-shaped walls 34, 36. In other words, no radially ring-shaped walls 34, 36 are required for axially mounting the stator 40 in the presence of axial grooves 33. Moreover, the grooves, or the elevations of the retaining body therein, can be better cooled if these are configured as axial grooves 33, or axial elevations 56, respectively. The optimized cooling of the potting body 50 on the axial end wall 32 can be provided in particular if the cooling device 60 is provided in or axially adjacent to the axial end wall 32.

In some design embodiments, the potting body 50 can be conceived to secure the stator 40 in terms of rotation. The rotational securing of the stator 40 can be provided, for example, by axial grooves 33 and elevations 56 which are spaced apart in the circumferential direction 6. Alternatively, the rotational securing of the stator 40 can be provided by a design embodiment of the axial grooves 33 and elevations 56 which is corrugated or zigzag-shaped in the circumferential direction 6. In other words, the axial grooves 33 and/or the elevations 56 can be configured to secure the stator 40 in terms of rotation. A form-fit can be achieved in that the potting body 50 engages in the axial grooves 33 during potting and cures in the latter.

The stator assembly 10 of FIG. 6 differs from the stator assembly 10 of FIG. 5 in particular in that the stator receptacle portion 30 comprises a radially inner ring-shaped wall 34 and a radially outer ring-shaped wall 36. A radial groove 35 is disposed in the radially inner ring-shaped wall 34. As has already been described earlier, a corresponding radial elevation 55 of the potting body 50 engages in the radial groove 35. Moreover, a first axial groove 33 is disposed in the axial end wall 32 radially within the stator 40. The first axial groove 33 is configured to be conical or trapezoidal, in a manner analogous to the first axial groove 33 of the stator assembly 10 from FIG. 5. A corresponding first axial elevation 56 engages in the first axial groove 33. Furthermore, a second axial groove 33 is disposed radially outside the stator 40. The second axial groove 33 is disposed in a corner between the radially outer ring-shaped wall 36 and the axial end wall 32. This means that the second axial groove 33 is disposed in the radially outer ring-shaped wall 36 and the axial end wall 32. By way of example, the second axial groove 33 has a round cross section in a plane defined by the axial direction 2 and the radial direction 4. Alternatively, the second axial groove 33 can also have another suitable cross section which is configured to form an undercut for the potting body 50 to engage for the axial mounting of the stator 40. While the stator assembly 10 of FIG. 6 is illustrated having two axial grooves 33 and one radial groove 35, it is also conceivable that the stator assembly 10 could comprise only one or two of the three grooves 33, 35 illustrated. Alternatively or additionally, the stator assembly 10 could also comprise further grooves in addition to the depicted grooves 33, 35, 37. For example, a radial groove 37 could also be disposed in the radially outer ring-shaped wall 36. It is to be understood that while occasionally only grooves 33, 35, 37 are mentioned in the context of this disclosure, corresponding elevations 55, 56, 57 are included in the stator assembly 10, or the potting body 50 engages in the corresponding grooves 33, 35, 37, respectively.

Moreover, design embodiments of stator assemblies 10 having only one of the radially inner ring-shaped wall 34 and the radially outer ring-shaped wall 36 are conceivable. One axial groove or a plurality of axial grooves 33 and/or one radial groove or a plurality of radial grooves 35, 37 can be provided herein.

Figure 7:
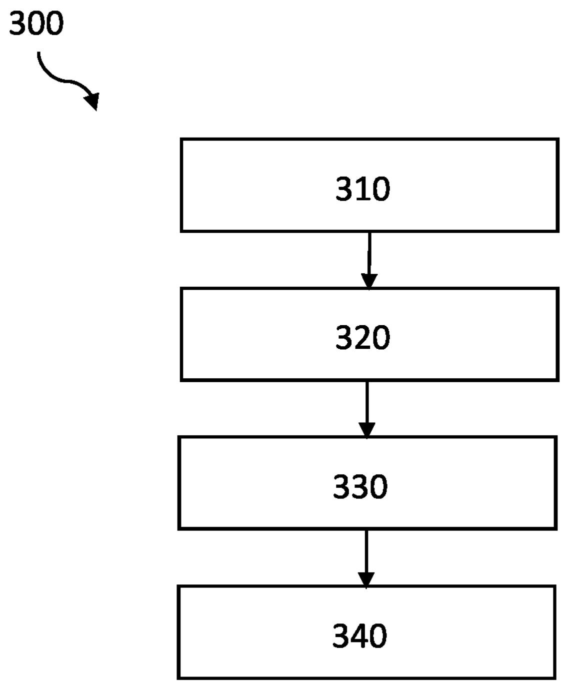
FIG. 7 schematically shows a flow chart of a method for producing a stator assembly for an axial flux motor.

FIG. 7 schematically shows the method 300 for producing a stator assembly 10 for an axial flux motor 100. The method 300 can in particular be conceived for producing the stator assembly 10 according to any one of the preceding design embodiments.

The method 300 comprises the following steps. Providing 310 a stator receptacle portion 30 of a motor housing 20 of the axial flux motor 100, wherein the stator receptacle portion 30 defines a disk-shaped contact face **32*a* for receiving the stator. Providing 320 a stator 40. Placing 330 the stator 40 on the disk-shaped contact face 32*a*. Filling 340 potting compound into a ring-shaped depression 31. The ring-shaped depression 31 is at least partially defined by the ring-shaped contact face 32*a*. The potting compound is filled between the stator 40 and the stator receptacle portion 30, as a result of which a potting body 50 is provided by curing the potting compound. The potting body 50 herein is connected in a form-fitting manner to the stator receptacle portion 30 in such a way that the stator 40 in the stator receptacle portion 30 is secured by the potting body 50 at least in the axial direction 2. The placing of the stator 40 can in particular comprise centering of the stator 40 on the disk-shaped contact face 32*a* (for example by pins and/or a centering depression). The stator receptacle portion 30 can comprise a radially inner ring-shaped wall 34 and/or a radially outer ring-shaped wall 36. The radially inner ring-shaped wall 34 and/or the radially outer ring-shaped wall 36 can extend in the axial direction 2 away from the axial end face 32*a* and, conjointly with the disk-shaped contact face 32*a*, define the ring-shaped depression 32 as a result. Alternatively, the radially inner ring-shaped wall 34 and/or the radially outer ring-shaped wall 36 can be provided by a potting mold during potting, so as to define the ring-shaped depression 31 conjointly with the disk-shaped contact face 32*a***. The potting mold can be removed again after curing.

In design embodiments of the method 300, the stator 40 can be wound with electrical windings 46 prior to being incorporated into the ring-shaped depression 31. In this instance, the stator 40 can be placed as a wound stator 40 on the disk-shaped contact face **32*a*. In design embodiments of the method 300, the wound stator 40 can be potted with the potting compound and, as a result, be fixed in the potting body 50 once the potting compound has cured. In design embodiments of the method 300, the potting compound can be poured into one groove or a plurality of grooves 33, 35, 37 which are recessed into the stator receptacle portion 30, so as to establish the form-fitting connection to the stator receptacle portion 30 once the potting compound has cured. In design embodiments of the method 300, the potting compound can be poured in in such a manner that one elevation or a plurality of elevations 55, 56, 57 which are complementary to the one groove or the plurality of grooves 33, 35, 37 are formed in the potting body 50 after curing. In design embodiments of the method 300, a resin material can be used as the potting compound. A synthetic resin material can in particular be used as the potting compound. In design embodiments of the method 300**, the potting compound can comprise feelers promoting thermal conductivity.

While the present invention has been described above and is defined in the appended claims, it is to be understood that the invention can alternatively also be defined according to the following embodiments:

1. Stator assembly (10) for an axial flux motor (100) having a rotation axis (100*a*), comprising:

a stator receptacle portion (30) of a motor housing (20) of the axial flux motor (100), wherein the stator receptacle portion (30) defines a disk-shaped contact face (32*a*) for receiving the stator, a stator (40) which is disposed on the disk-shaped contact face (32*a*), and a potting body (50), wherein the stator (40) is potted in the stator receptacle portion (30) and the potting body (50) is connected to the stator receptacle portion (30) in a form-fitting manner in such a way that the stator (40) in the stator receptacle portion (30) is secured by the potting body (50) at least in the axial direction (2).

2. Stator assembly (10) according to embodiment 1, wherein the potting body (50) is connected to the stator receptacle portion (30) in a form-fitting manner by way of one groove or a plurality of grooves (33, 35, 37).

3. Stator assembly (10) according to embodiment 2, wherein the one groove or the plurality of grooves (33, 35, 37) is/are recessed into the stator receptacle portion (30) in the radial direction (4) and/or in the axial direction (2).

4. Stator assembly (10) according to any of embodiments 2 or 3, wherein the one groove or the plurality of grooves (33, 35, 37) is/are recessed into the stator receptacle portion (30) and configured in such a manner that the one groove or the plurality of grooves (33, 35, 37) define an undercut for the potting body (50) to engage in the axial direction (2).

5. Stator assembly (10) according to any of embodiments 2 to 4, wherein the potting body (50) engages in the one groove or the plurality of grooves (33, 35, 37).

6. Stator assembly (10) according to any of embodiments 2 to 5, wherein the one groove or the plurality of grooves (33, 35, 37) extends/extend in a substantially ring-shaped manner in the circumferential direction (6).

7. Stator assembly (10) according to any of embodiments 2 to 6, wherein the one groove or the plurality of grooves (33, 35, 37) extends/extend over a region of approximately between 30° to approximately 360°.

8. Stator assembly (10) according to any of the preceding embodiments, wherein the stator receptacle portion (30) comprises an axial end wall (32) which defines the disk-shaped contact face (32*a*).

9. Stator assembly (10) according to embodiment 8, wherein the axial end wall (32) is configured to be substantially disk-shaped.

10. Stator assembly (10) according to any of embodiments 8 to 9, if dependent on at least embodiment 2, wherein at least one groove (33) is recessed into the axial end wall (32) in the axial direction (2).

11. Stator assembly (10) according to any of embodiments 8 to 10, wherein the stator receptacle portion (30) furthermore comprises a radially inner ring-shaped wall (34) and a radially outer ring-shaped wall (36) which, conjointly with the axial end wall (32), delimit a ring-shaped depression (31).

12. Stator assembly (10) according to embodiment 11, wherein the radially inner ring-shaped wall (34) and the radially outer ring-shaped wall (36) extend in the axial direction (2) away from the axial end wall (32).

13. Stator assembly (10) according to any of embodiments 11 to 12, if dependent on at least embodiment 2, wherein the one groove or the plurality of grooves (35, 37) are recessed radially into the radially inner ring-shaped wall (34) and/or into the radially outer ring-shaped wall (36).

14. Stator assembly (10) according to any of embodiments 11 to 13, if dependent on at least embodiment 2, wherein at least one groove (35) is recessed radially inwardly into the radially inner ring-shaped wall (34).

15. Stator assembly (10) according to any of embodiments 11 to 14, if dependent on at least embodiment 2, wherein at least one groove (37) is recessed radially outwardly into the radially outer ring-shaped wall (36).

16. Stator assembly (10) according to any of embodiments 11 to 15, if dependent on at least embodiment 2, wherein at least one of the one groove or the plurality of grooves (35, 37) is disposed only within an axial region (31*a*) which extends from the axial end wall (32) in the axial direction (2) by up to 50% of a maximum axial width of the potting body (50), in particular which extends from the axial end wall (32) in the axial direction (2) by up to 30% of a maximum axial width of the potting body (50).

17. Stator assembly (10) according to any of embodiments 11 to 16, if dependent on at least embodiment 2, wherein at least one of the one groove or the plurality of grooves (35, 37) extends in the axial direction (2) at least up to 10%, preferably at least up to 5%, and particularly preferably at least up to 2%, of a maximum axial width of the potting body (50) in front of the axial end wall (32).

18. Stator assembly (10) according to any of embodiments 11 to 17, if dependent on at least embodiment 2, wherein at least one of the one groove or the plurality of grooves (35, 37) extends in the axial direction (2) away from the axial end wall (32) by at most up to 30%, preferably by at most up to 25%, and particularly preferably by at most up to 20%, of a maximum axial width of the potting body (50).

19. Stator assembly (10) according to any of the preceding embodiments, furthermore comprising a cooling device (60) which is disposed in or axially adjacent to the stator receptacle portion (30).

20. Stator assembly (10) according to embodiment 19, wherein the cooling device (60) comprises at least one cooling duct.

21. Stator assembly (10) according to embodiment 20, wherein the cooling duct extends in a substantially ring-shaped manner in the circumferential direction (6) in the stator receptacle portion (30).

22. Stator assembly (10) according to any of embodiments 19 to 21, if dependent on at least embodiment 8, wherein the cooling device (60) is disposed in or axially adjacent to the axial end wall (32).

23. Stator assembly (10) according to any of the preceding embodiments, if dependent on at least embodiment 8, wherein the stator (40) is disposed so as to be in direct contact with the axial end wall (32).

24. Stator assembly (10) according to any of the preceding embodiments, if dependent on at least embodiment 11, wherein the stator (40) is disposed radially within the radially outer ring-shaped wall (36).

25. Stator assembly (10) according to any of the preceding embodiments, if dependent on at least embodiment 11, wherein the stator (40) is disposed radially outside the radially inner ring-shaped wall (34).

26. Stator assembly (10) according to any of the preceding embodiments, wherein the stator (40) comprises a ring-shaped stator yoke (42) and a plurality of stator teeth (44) which extend in the axial direction (2) from the stator yoke (42) so as to be distributed in the circumferential direction (6).

27. Stator assembly (10) according to embodiment 26, wherein the stator yoke (42) and the stator teeth (44) are produced from a wound metallic laminated core.

28. Stator assembly (10) according to any of embodiments 26 or 27, wherein the stator (40) furthermore comprises a plurality of electrical windings (46) which are in each case wound about the stator teeth (44).

29. Stator assembly (10) according to any of the preceding embodiments, furthermore comprising a centering device (70) which positions the stator (40) so as to be coaxial with the rotation axis (100*a*) in the stator receptacle portion (30).

30. Stator assembly (10) according to embodiment 24, wherein the centering device (70) is conceived to secure the stator (40) in terms of rotation in the stator receptacle portion (30).

31. Stator assembly (10) according to any of the preceding embodiments, wherein the potting body (50) comprises a resin material, in particular a synthetic resin material.

32. Axial flux motor (100) for a fan (1), comprising:
- a motor housing (20),
- a shaft (112) which is rotationally mounted in the motor housing (20),
- at least one rotor (114) which is disposed so as to be rotationally fixed on the shaft (112) in the motor housing (20),
- a stator assembly (10) according to any of the preceding embodiments, wherein the stator (40) is disposed so as to be axially adjacent to the rotor (114) in the motor housing (20).

33. Axial flux motor (100) according to embodiment 32, wherein the rotor (114) is configured to be disk-shaped and comprises a plurality of permanent magnets which are disposed so as to be distributed in the circumferential direction (6).

34. Axial flux motor (100) according to any of embodiments 32 or 33, comprising two stator assemblies (10), wherein the rotor (114) is disposed axially between the stators (40) of the two stator assemblies (10).

35. Axial flux motor (100) according to any of embodiments 32 to 34, wherein the axial flux motor (100) is configured as a high-voltage axial flux motor for a high-voltage fan (1) of an electric vehicle.

36. High-voltage fan (1) comprising:
- an axial flux motor (100) according to any of embodiments 32 to 35, and a fan impeller (200) which is disposed so as to be rotationally fixed on the shaft (112) outside the motor housing (20).

37. Method (300) for producing a stator assembly (10) for an axial flux motor (100), comprising the steps:
- providing (310) a stator receptacle portion (30) of a motor housing (20) of the axial flux motor (100), wherein the stator receptacle portion (30) defines a disk-shaped contact face (32*a*) for receiving the stator,
- providing (320) a stator (40),
- placing (330) the stator (40) on the disk-shaped contact face (32*a*),
- filling (340) potting compound into a ring-shaped depression (31), which is at least partially defined by the disk-shaped contact face (32*a*), between the stator (40) and the stator receptacle portion (30), as a result of which, by curing the potting compound, is provided a potting body (50) which is connected to the stator receptacle portion (30) in a form-fitting manner in such a way that the stator (40) in the stator receptacle portion (30) is secured by the potting body (50) at least in the axial direction (2).

38. Method according to embodiment 37, wherein the stator (40) is wound with electrical windings (46) prior to being incorporated into the ring-shaped depression (31), and is placed as wound stator (40) on the disk-shaped contact face (32*a*).

39. Method according to embodiment 38, wherein the wound stator (40) is potted with the potting compound and, as a result, is fixed in the potting body (50) once the potting compound has cured.

40. Method according to any of embodiments 37 to 39, wherein the potting compound is poured into one groove or a plurality of grooves (33, 35, 37) which are recessed into the stator receptacle portion (30), so as to establish the form-fitting connection to the stator receptacle portion (30) once the potting compound has cured.

41. Method according to embodiment 40, wherein the potting compound is poured in in such a manner that one elevation or a plurality of elevations (55, 56, 57) which are complementary to the one groove or the plurality of grooves (33, 35, 37) are formed in the potting body (50) after curing.

42. Method according to any of embodiments 37 to 41, wherein a resin material, in particular a synthetic resin material, is used as the potting compound, which is optionally provided with fillers promoting thermal conductivity.

LIST OF REFERENCE SIGNS

1 Fan
2 Axial direction
4 Radial direction
6 Circumferential direction
10 Stator assembly
20 Motor housing
30 Stator receptacle portion
31 Ring-shaped depression
31*a* Axial region
32 Axial end wall
32*a* Disk-shaped contact face, first axial face
32*b* Second axial face
33 Axial groove
34 Radially inner ring-shaped wall
35 Radial groove, radially inner groove
36 Radially outer ring-shaped wall
37 Radial groove, radially outer groove
40 Stator
42 Stator yoke
44 Stator teeth
45 Casing
46 Electrical windings
50 Potting body
55 Radial elevation, radially inner elevation
56 Axial elevation
57 Radial elevation, radially outer elevation
60 Cooling device
70 Centering device
100 Axial flux motor
100*a* Rotation axis
112 Shaft
114 Rotor
200 Fan impeller

The invention claimed is:

1. A stator assembly (10) for an axial flux motor (100) having a rotation axis (100 *a*), comprising:
- a stator receptacle portion (30) of a motor housing (20) of the axial flux motor (100), wherein the stator receptacle portion (30) defines a disk-shaped contact face (32 *a*) for receiving the stator, a stator (40), which is disposed on the disk-shaped contact face (32 *a*), and a potting body (50), wherein the stator (50) is potted in the stator receptacle portion (30), and the potting body (50) is connected to the stator receptacle portion (30) in a form-fitting manner by way of one groove or a plurality of grooves (33, 35, 37) in such a way that the stator (4) in the stator receptacle portion (30) is secured by the potting body (50) at least in the axial direction (2), wherein the stator receptacle portion (30) comprises an axial end wall (32) which defines the disk-shaped contact face (32*a*), wherein the stator receptacle portion (30) furthermore comprises at least one of a radially inner ring-shaped wall (34) and a radially outer ring-shaped wall (36) which, conjointly with the axial end wall (32), delimit a ring-shaped depression (31), and wherein the one groove or the plurality of grooves (35, 37) are recessed radially into at least one of the radially inner ring-shaped wall (34) and the radially outer ring-shaped wall (36).

2. The stator assembly (10) as claimed in claim 1, wherein the one groove or the plurality of grooves (33, 35, 37) is/are recessed into the stator receptacle portion (30) in at least one of radial direction (4) and axial direction (2).

3. The stator assembly (10) as claimed in claim 1, wherein the one groove or the plurality of grooves (33, 35, 37) is/are recessed into the stator receptacle portion (30) and configured in such a manner that the one groove or the plurality of grooves (33, 35, 37) defines/define an undercut for the potting body (50) to engage with in the axial direction (2).

4. The stator assembly (10) as claimed in claim 1, wherein the potting body (50) engages in the one groove or the plurality of grooves (33, 35, 37).

5. The stator assembly (10) as claimed in claim 1, wherein the one groove or the plurality of grooves (33, 35, 37) extends/extend in a substantially ring-shaped manner in the circumferential direction (6).

6. The stator assembly (10) as claimed in claim 1, wherein at least one groove (33) is recessed into the axial end wall (32) in the axial direction (2).

7. The stator assembly (10) as claimed in claim 1, wherein at least one of the one groove or plurality of grooves (35, 37) extends in the axial direction (2) away from the axial end wall (32) by at most up to 30% of a maximum axial width of the potting body (50).

8. The stator assembly (10) as claimed in claim 1, furthermore comprising a cooling device (60) which is disposed so as to be in or axially adjacent to the stator receptacle portion (30).

9. The stator assembly (10) as claimed in claim 1, wherein the potting body (50) comprises a resin material.

10. An axial flux motor (100) for a fan (1), comprising:

a motor housing (20), a shaft (112) which is rotationally mounted in the motor housing (20), at least one rotor (114) which is disposed so as to be rotationally fixed on the shaft (112) in the motor housing (220), a stator assembly (10) as claimed in claim 1, wherein the stator (40) is disposed so as to be axially adjacent to the rotor (114) in the motor housing (20).

11. A high-voltage fan (1) comprising:

an axial flux motor (100) as claimed in claim 10, and a fan wheel (200) which is mounted so as to be rotationally fixed on the shaft (112) outside the motor housing (20).

12. A method (300) for producing a stator assembly (10) for an axial flux motor (100), comprising the following method steps:

providing (310) a stator receptacle portion (30) of a motor housing (20) of the axial flux motor (100), wherein the stator receptacle portion (30) defines a disk-shaped contact face (32 *a*) for receiving the stator, wherein the stator receptacle portion (30) comprises an axial end wall (32) which defines the disk-shaped contact face (32*a*), wherein the stator receptacle portion furthermore comprises at least one of a radially inner ring-shaped wall (34) and a radially outer ring-shaped wall (36) which, conjointly with the axial end wall (32), delimit a ring-shaped depression (31), and wherein the one groove or the plurality of grooves (35, 37) are recessed radially into at least one of the radially inner ring-shaped wall (34) and the radially outer ring-shaped wall (36), providing (320) a stator (40), placing (330) the stator (40) on the disk-shaped contact face (32 *a*), filling (340) potting compound into the ring-shaped depression (31), which is at least partially defined by the ring-shaped contact face (32 *a*), between the stator (40) and the stator receptacle portion (30), as a result of which, by curing the potting compound, is provided a potting body (50) which is connected to the stator receptacle portion (30) in a form-fitting manner by way of one groove or a plurality of grooves (33, 35, 37) in such a way that the stator (40) is potted in the stator receptacle portion (30) by being secured by the potting body (50) at least in the axial direction (2).

* * * * *